US012803125B2

(12) United States Patent
Fujishima

(10) Patent No.: US 12,803,125 B2
(45) Date of Patent: Nov. 17, 2026

(54) WELDED STRUCTURE AND MANUFACTURING METHOD THEREOF, AND BATTERY AND MANUFACTURING METHOD THEREOF

(71) Applicant: TOYOTA JIDOSHA KABUSHIKI KAISHA, Toyota (JP)

(72) Inventor: Seigo Fujishima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 991 days.

(21) Appl. No.: 17/939,442

(22) Filed: Sep. 7, 2022

(65) Prior Publication Data

US 2023/0073131 A1 Mar. 9, 2023

(30) Foreign Application Priority Data

Sep. 9, 2021 (JP) ................................ 2021-146767

(51) Int. Cl.
*H01M 50/516* (2021.01)
*H01M 50/557* (2021.01)
*H01M 50/562* (2021.01)

(52) U.S. Cl.
CPC ....... *H01M 50/516* (2021.01); *H01M 50/557* (2021.01); *H01M 50/562* (2021.01)

(58) Field of Classification Search
CPC ............. H01M 50/516; H01M 50/557; H01M 50/562; H01M 2220/20; H01M 50/211;
(Continued)

(56) References Cited

U.S. PATENT DOCUMENTS

2009/0223940 A1 9/2009 Hosoya
2011/0052969 A1* 3/2011 Cai .................... H01M 50/516 429/158
(Continued)

FOREIGN PATENT DOCUMENTS

CN 101081468 A 12/2007
CN 110140235 A 8/2019
(Continued)

OTHER PUBLICATIONS

English translation of WO-2010035696-A1 (Year: 2010).*

*Primary Examiner* — Ula C Ruddock
*Assistant Examiner* — Sarika Gupta
(74) *Attorney, Agent, or Firm* — Dinsmore & Shohl LLP

(57) ABSTRACT

A manufacturing method of a welded structure in which metal members are welded to each other includes bringing the metal members into contact with each other so as to form a space surrounded by the metal members, a pressure reducing port is formed between the metal members or in at least one metal member of the metal members, the manufacturing method of the welded structure further includes performing a suction operation on the space through the pressure reducing port to depressurize the space so as to bring the first portion of the metal member into contact with the second portion of the metal member, or to make a distance between the first portion and the second portion smaller than that when the space is not depressurized; and welding the first portion and the second portion to each other in a state where the space is depressurized.

1 Claim, 6 Drawing Sheets

(58) Field of Classification Search
CPC .. H01M 50/224; H01M 50/522; H01M 50/55; H01M 50/553; H01M 50/566; Y02E 60/10
See application file for complete search history.

(56) References Cited

U.S. PATENT DOCUMENTS

| | | | |
|---|---|---|---|
| 2019/0308271 | A1 | 10/2019 | Hioki et al. |
| 2019/0366877 | A1 | 12/2019 | Blersch et al. |
| 2020/0194768 | A1 | 6/2020 | Choi et al. |

FOREIGN PATENT DOCUMENTS

| | | | | |
|---|---|---|---|---|
| CN | 110545946 | A | 12/2019 | |
| JP | 2019-181496 | A | 10/2019 | |
| WO | 2006/016441 | A1 | 2/2006 | |
| WO | WO-2010035696 | A1 * | 4/2010 | ........... C03B 23/245 |

* cited by examiner

WELDED STRUCTURE AND MANUFACTURING METHOD THEREOF, AND BATTERY AND MANUFACTURING METHOD THEREOF

CROSS REFERENCE TO RELATED APPLICATIONS

This nonprovisional application claims priority to Japanese Patent Application No. 2021-146767 filed on Sep. 9, 2021 with the Japan Patent Office, the entire contents of which are hereby incorporated by reference.

BACKGROUND

Field

The present disclosure relates to a welded structure and a manufacturing method thereof, and a battery and a manufacturing method thereof.

Description of the Background Art

Japanese Patent Laying-Open No. 2019-181496 discloses a laser welding method by which metal plates can be easily welded to each other even when a gap between the metal plates is large.

SUMMARY

An object of the present disclosure is to provide a welded structure in which metal members are more sufficiently welded to each other and a manufacturing method thereof, and a battery in which electrode terminals of battery cells are more sufficiently welded to each other and a manufacturing method thereof.

The manufacturing method of a welded structure according to the present disclosure is a manufacturing method of a welded structure in which a first metal member and a second metal member are welded to each other. The manufacturing method includes bringing the first metal member and the second metal member into contact with each other so as to form a space surrounded by the first metal member and the second metal member, wherein a pressure reducing port is formed between the first metal member and the second metal member or in at least one metal member of the first metal member and the second metal member; the manufacturing method of a welded structure further includes performing a suction operation on the space through the pressure reducing port to depressurize the space so as to bring a first portion of the first metal member into contact with a second portion of the second metal member or to make a distance between the first portion of the first metal member and the second portion of the second metal member smaller than that when the space is not depressurized; and welding the first portion of the first metal member and the second portion of the second metal member to each other in a state where the space is depressurized.

In the manufacturing method of a welded structure, it is acceptable that the first metal member is made of copper, and the second metal member is made of aluminum.

In the manufacturing method of a welded structure, the first portion of the first metal member and the second portion of the second metal member may be welded to each other by irradiating an outer surface of the second metal member with a laser beam that travels in a direction from the second portion of the second metal member toward the first portion of the first metal member.

In the manufacturing method of a welded structure, it is acceptable that the first metal member includes a bottom plate portion and a peripheral wall portion surrounding the bottom plate portion, the space is defined by the bottom plate portion, the peripheral wall portion and the second metal member, the bottom plate portion is provided with a convex portion, and the convex portion protrudes from the bottom plate portion, a distal end of the convex portion in a protruding direction defines the first portion, and a part of the second metal member facing the first portion defines the second portion.

A manufacturing method of a battery according to the present disclosure includes: stacking a first battery cell having a first electrode terminal and a second battery cell having a second electrode terminal; and forming a welded structure in which the first electrode terminal which serves as the first metal member and the second electrode terminal which serves as the second metal member are welded to each other in accordance with the manufacturing method of a welded structure according to the present disclosure.

In the manufacturing method of a battery, when a direction along which the first battery cell and the second battery cell are stacked is defined as a stacking direction, and a direction intersecting the stacking direction is defined as an intersecting direction, the first electrode terminal includes a first extending portion extending from a main body of the first battery cell in the intersecting direction, a first bent portion formed at a distal end of the first extending portion in the extending direction of the first extending portion, and a first joining portion extending from the first bent portion in a direction parallel to the stacking direction, the second electrode terminal includes a second extending portion extending from a main body of the second battery cell in the intersecting direction, a second bent portion formed at a distal end of the second extending portion in the extending direction of the second extending portion, and a second joining portion extending from the second bent portion in a direction parallel to the stacking direction, and the welded structure may be formed by welding the first joint portion and the second joint portion to each other.

A welded structure according to the present disclosure includes a first metal member and a second metal member joined to the first metal member by welding, wherein the first metal member and the second metal member are brought into contact with each other so as to form a space surrounded by the first metal member and the second metal member, a pressure reducing port is formed between the first metal member and the second metal member or in at least one metal member of the first metal member and the second metal member, the first metal member includes a bottom plate portion and a peripheral wall portion surrounding the bottom plate portion, the space is defined by the bottom plate portion, the peripheral wall portion, and the second metal member, the bottom plate portion is provided with a convex portion, and the convex portion protruding from the bottom plate portion, and a distal end of the convex portion in a protruding direction and a part of the second metal member facing the distal end are welded to each other.

A battery according to the present disclosure includes a first battery cell having a first electrode terminal and a second battery cell having a second electrode terminal and stacked on the first battery cell, and the welded structure according to the present disclosure is formed by welding the first electrode terminal which serves as the first metal member and the second electrode terminal which serves as the second metal member to each other.

The foregoing and other objects, features, aspects and advantages of the present disclosure will become more apparent from the following detailed description of the present disclosure when taken in conjunction with the accompanying drawings.

DETAILED DESCRIPTION

Figure 1:
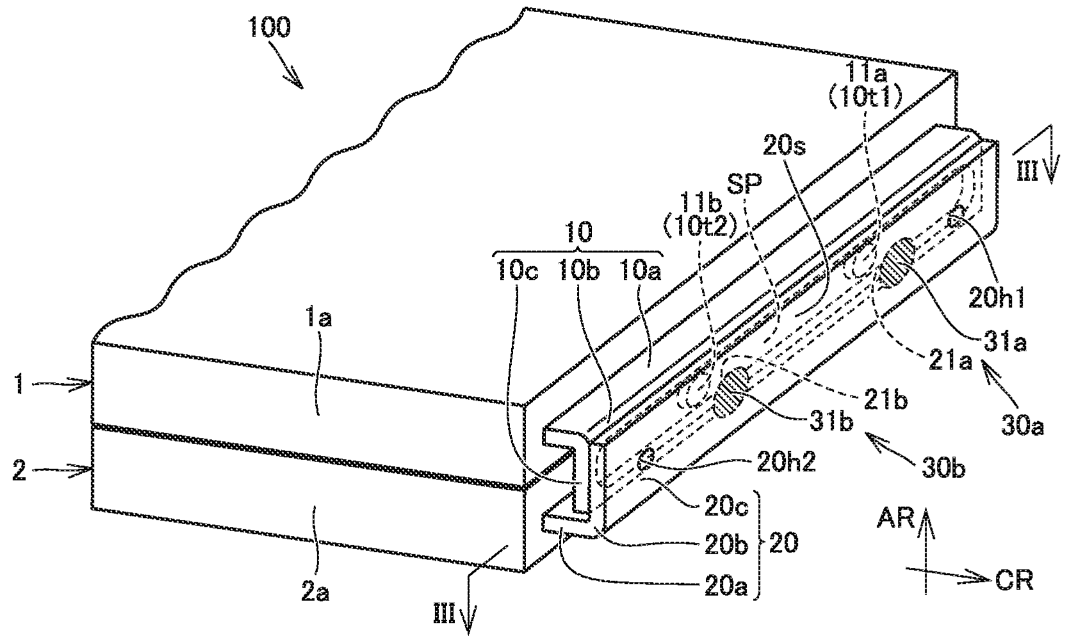
FIG. 1 is a perspective view illustrating welded structures 30*a* and 30*b* formed by a first battery cell 1 and a second battery cell 2 provided in a battery 100.

An embodiment of the present disclosure will be described below. It should be noted that unless otherwise specified, the scope of the present disclosure is not limited to the number, the amount or the like cited in the embodiment to be described below. The same or equivalent portions in the drawings will be denoted by the same reference numerals, and the description thereof will not be repeated.

[Battery 100]

FIG. 1 is a perspective view illustrating welded structures 30*a* and 30*b* formed by a first battery cell 1 and a second battery cell 2 provided in a battery 100. The battery 100 may be mounted on a vehicle such as a hybrid electric vehicle, a plug-in hybrid electric vehicle, a fuel cell electric vehicle, or a battery electric vehicle.

Figure 2:
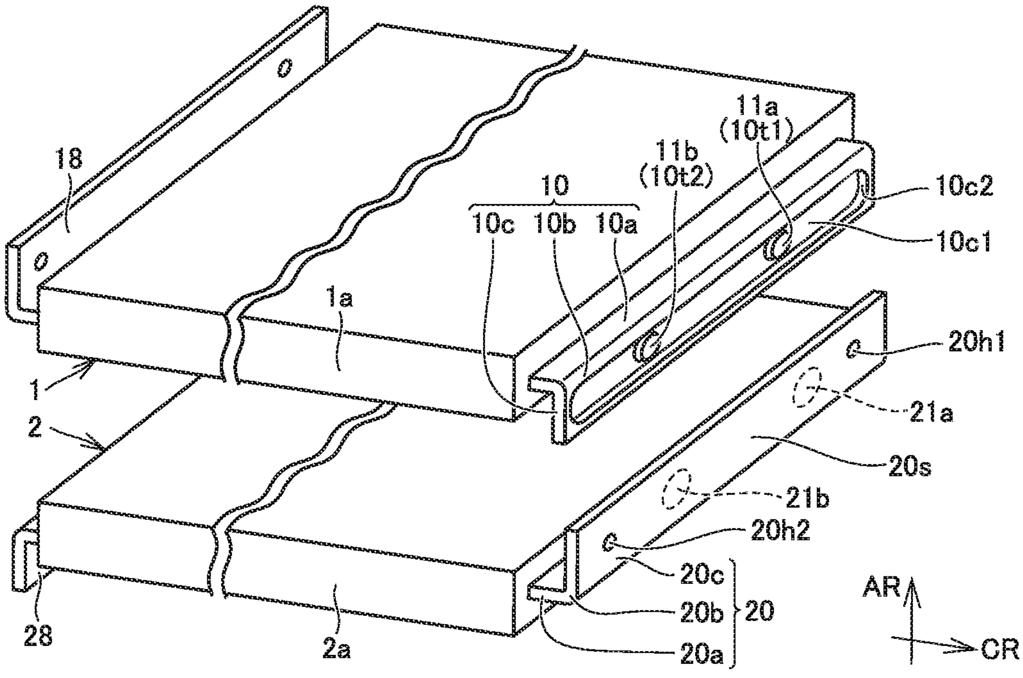
FIG. 2 is a perspective view illustrating a state in which the first battery cell 1 and the second battery cell 2 provided in the battery 100 are separated from each other.

The battery 100 includes a first battery cell 1, and a second battery cell 2 stacked on the first battery cell 1. The number of battery cells included in the battery 100 is not particularly limited. As an example, the battery cell may be a lithium ion battery. FIG. 2 is a perspective view illustrating a state in which the first battery cell 1 and the second battery cell 2 provided in the battery 100 are separated from each other.

In FIGS. 1 and 2, a stacking direction along which the first battery cell 1 and the second battery cell 2 are stacked is indicated by an arrow AR. In FIG. 1, an intersecting direction which intersects the stacking direction AR is indicated by an arrow CR (in the present embodiment, as an example, the intersecting direction is orthogonal to the stacking direction AR). The stacking direction AR and the intersecting direction CR defined in FIGS. 1 and 2 are also illustrated in the other drawings (FIGS. 3 to 10).

The first battery cell 1 includes a main body 1*a*, an electrode terminal 10 (a first electrode terminal), and an electrode terminal 18 (see FIG. 2). The first battery cell 1 is, for example, a laminated cell. Although not illustrated in detail, a power generation element is formed by stacking a plurality of electrode bodies in the main body 1*a* of the first battery cell 1, and the power generation element is sealed with a laminate film together with an electrolytic solution, whereby the main body 1*a* has a flat shape as a whole. The electrode terminal 10 protrudes from one side of the main body 1*a* in the intersecting direction CR, and the electrode terminal 18 protrudes from the other side of the main body 1*a* in the intersecting direction CR.

The second battery cell 2 includes a main body 2*a*, an electrode terminal 20 (a second electrode terminal), and an electrode terminal 28 (FIG. 2). The second battery cell 2 is, for example, a laminated cell. Although not illustrated in detail, a power generation element is formed by stacking a plurality of electrode bodies in the main body 2*a* of the second battery cell 2, and the power generation element is sealed with a laminate film, whereby the main body 2*a* has a flat shape as a whole. The electrode terminal 20 protrudes from one side of the main body 2*a* in the intersecting direction CR, and the electrode terminal 28 protrudes from the other side of the main body 2*a* in the intersecting direction CR.

[Welded Structures 30*a* and 30*b*]

The battery 100 includes welded structures 30*a* and 30*b* (see FIG. 1). The welded structures 30*a* and 30*b* are formed by welding the electrode terminal 10 of the first battery cell 1 and the electrode terminal 20 of the second battery cell 2 to each other.

The electrode terminal 10 functions as a first metal member in the welded structures 30*a* and 30*b*. The electrode terminal 10 is, for example, a negative electrode terminal, and is made of copper. The electrode terminal 20 functions as a second metal member in the welded structures 30*a* and 30*b*. The electrode terminal 20 is, for example, a positive electrode terminal, and is made of aluminum. The battery 100 may include only one of the welded structures 30*a* and 30*b*.

Figure 3:
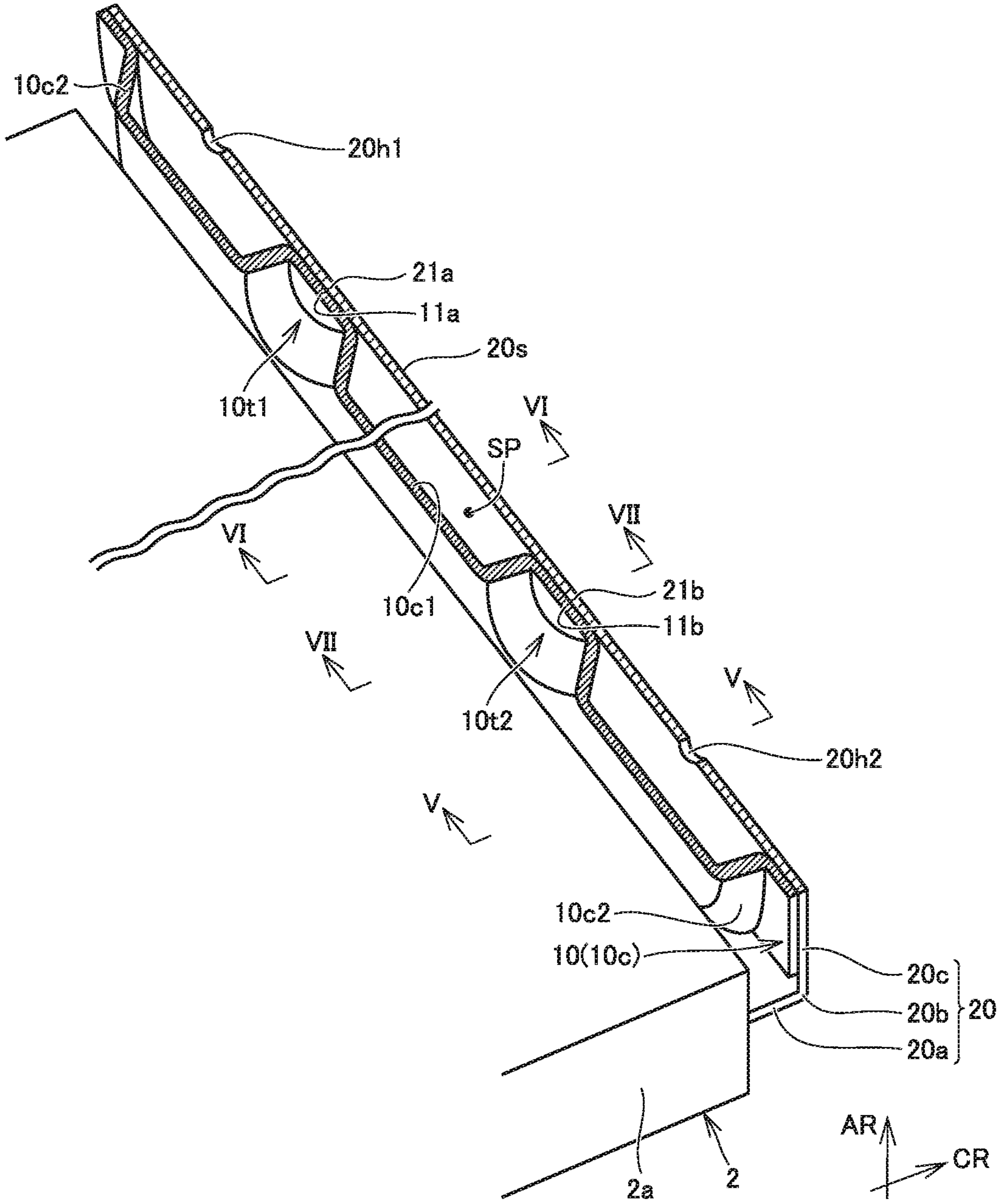
FIG. 3 is a cross-sectional perspective view taken along line III-III in FIG. 1.

FIG. 3 is a cross-sectional perspective view taken along line III-III in FIG. 1. FIG. 1 illustrates a state after the electrode terminals 10 and 20 are welded to each other. On the other hand, for convenience of explanation, FIG. 3 illustrates a state before the electrode terminals 10 and 20 are welded to each other.

(Electrode Terminal 10 (First Metal Member))

The electrode terminal 10 (see FIGS. 1 and 2) includes a first extending portion 10*a* extending from the main body 1*a* of the first battery cell 1 in the intersecting direction CR, a first bent portion 10*b* formed at a distal end of the first extending portion 10*a* in the extending direction of the first extending portion 10*a*, and a first joining portion 10*c* extending from the first bent portion 10*b* in a direction parallel to the stacking direction AR. The electrode terminal 10 has a substantially L-shape in the cross section as a whole, and each of the first extending portion 10*a* and the first joining portion 10*c* is formed in a substantially flat plate shape. The first extending portion 10*a* and the first joining portion 10*c* are joined to each other at the first bent portion 10*b* to form an angle of about 90° therebetween.

The electrode terminal 10 further includes a bottom plate portion 10*c*1 (see FIGS. 2 and 3) and a peripheral wall portion 10*c*2 surrounding the bottom plate portion 10*c*1. In the present embodiment, the bottom plate portion 10_c_1 and the peripheral wall portion 10_c_2 are both formed on the first joining portion 10_c_ of the electrode terminal 10. The bottom plate portion 10_c_1 and the peripheral wall portion 10_c_2 are formed on the first joining portion 10_c_ by recessing a part of the first joining portion 10_c_ in a direction opposite to the intersecting direction CR (in a direction toward the main body 1_a_).

The bottom plate portion 10_c_1 is formed with a convex portion 10_t_1 and a convex portion 10_t_2 by press molding or the like, and the convex portions 10_t_1 and 10_t_2 project from the bottom plate portion 10_c_1 in the intersecting direction CR (in a direction away from the main body 1_a_). The distal end of the convex portion 10_t_1 in the protruding direction thereof defines a first portion 11_a_, and is welded to the second joining portion 20_c_ of the electrode terminal 20. The distal end of the convex portion 10_t_2 in the protruding direction thereof defines a first portion 11_b_, and is welded to the second joining portion 20_c_ of the electrode terminal 20.

(Electrode Terminal 20 (Second Metal Member))

The electrode terminal 20 (see FIGS. 1 to 3) includes a second extending portion 20_a_ extending from the main body 2_a_ of the second battery cell 2 in the intersecting direction CR, a second bent portion 20_b_ formed at a distal end of the second extending portion 20_a_ in the extending direction of the second extending portion 20_a_, and a second joining portion 20_c_ extending from the second bent portion 20_b_ in a direction parallel to the stacking direction AR. The electrode terminal 20 has a substantially L-shape in the cross section as a whole, and each of the second extending portion 20_a_ and the second joining portion 20_c_ is formed in a substantially flat plate shape. The second extending portion 20_a_ and the second joining portion 20_c_ are joined to each other at the second bent portion 20_b_ to form an angle of about 90° therebetween.

A part of the second joining portion 20_c_ of the electrode terminal 20 facing the distal end of the convex portion 10_t_1 defines a second portion 21_a_, and is welded to the first portion 11_a_ of the electrode terminal 10. A part of the second joining portion 20_c_ of the electrode terminal 20 facing the distal end of the convex portion 10_t_2 defines a second portion 21_b_, and is welded to the first portion 11_b_ of the electrode terminal 10.

The electrode terminal 20 is further formed with a pressure reducing port 20_h_1 and a pressure reducing port 20_h_2. In the present embodiment, the pressure reducing ports 20_h_1 and 20_h_2 are formed to penetrate the second joining portion 20_c_ of the electrode terminal 20 in the thickness direction. In the present embodiment, the positions of the pressure reducing ports 20_h_1 and 20_h_2 are deviated from the positions of the convex portions 10_t_1 and 10_t_2 in the longitudinal direction of the first joining portion 10_c_ and the second joining portion 20_c_ (that is, in the direction orthogonal to the stacking direction AR and the intersecting direction CR).

(Space SP)

The electrode terminal 10 and the electrode terminal 20 are disposed in contact with each other, and thereby, a space SP surrounded by the electrode terminal 10 and the electrode terminal 20 is formed between the electrode terminal 10 and the electrode terminal 20. In the present embodiment, the space SP (see FIGS. 1 and 3) is defined by the bottom plate portion 10_c_1 of the electrode terminal 10, the peripheral wall portion 10_c_2 of the electrode terminal 10 and the second joining portion 20_c_ of the electrode terminal 20. It is also possible to provide an annularly extending sponge, adhesive or the like on the surface of these members continuously or intermittently after these members are brought into contact with each other so as to form a space SP with a higher degree of airtightness.

(Welding Traces 31_a_ and 31_b_)

As illustrated in FIG. 1, the convex portion 10_t_1 is provided at the electrode terminal 10, and the distal end (the first portion 11_a_) of the convex portion 10_t_1 in the protruding direction and the second portion 21_a_ of the second joining portion 20_c_ of the electrode terminal 20 are disposed to face each other. The first portion 11_a_ may be disposed to press against the second portion 21_a_ when a suction operation is not performed to reduce an internal pressure of the space SP, which will be described later. When the first portion 11_a_ of the electrode terminal 10 and the second portion 21_a_ of the electrode terminal 20 are welded to each other, a welding trace 31_a_ is formed on an outer surface 20_s_ of the second joining portion 20_c_ of the electrode terminal 20.

Similarly, the convex portion 10_t_2 is provided at the electrode terminal 10, and the distal end (the first portion 11_b_) of the convex portion 10_t_2 in the protruding direction and the second portion 21_b_ of the second joining portion 20_c_ of the electrode terminal 20 are disposed to face each other. The first portion 11_b_ may be configured to press against the second portion 21_b_ when a suction operation is not performed to reduce an internal pressure of the space SP, which will be described later. When the first portion 11_b_ of the electrode terminal 10 and the second portion 21_b_ of the electrode terminal 20 are welded to each other, a welding trace 31_b_ is formed on the outer surface 20_s_ of the second joining portion 20_c_ of the electrode terminal 20.

(Manufacturing Method)

A manufacturing method of the welded structures 30_a_ and 30_b_ will be described in the following. As illustrated in FIG. 2, the first battery cell 1 and the second battery cell 2 are prepared, and as illustrated in FIG. 3 (and FIG. 1), the first battery cell 1 and the second battery cell 2 are stacked. The electrode terminal 10 (the first metal member) and the electrode terminal 20 (the second metal member) are brought into contact with each other to form a space SP surrounded by the electrode terminal 10 and the electrode terminal 20.

Figure 4:
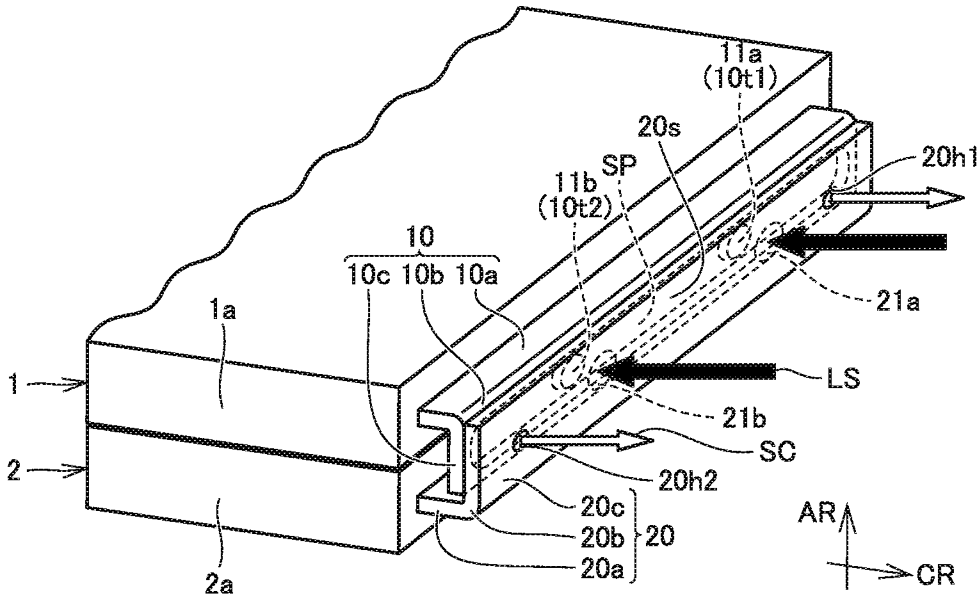
FIG. 4 is a perspective view illustrating a state in which an electrode terminal 10 and an electrode terminal 20 are welded to each other.
Figure 5:
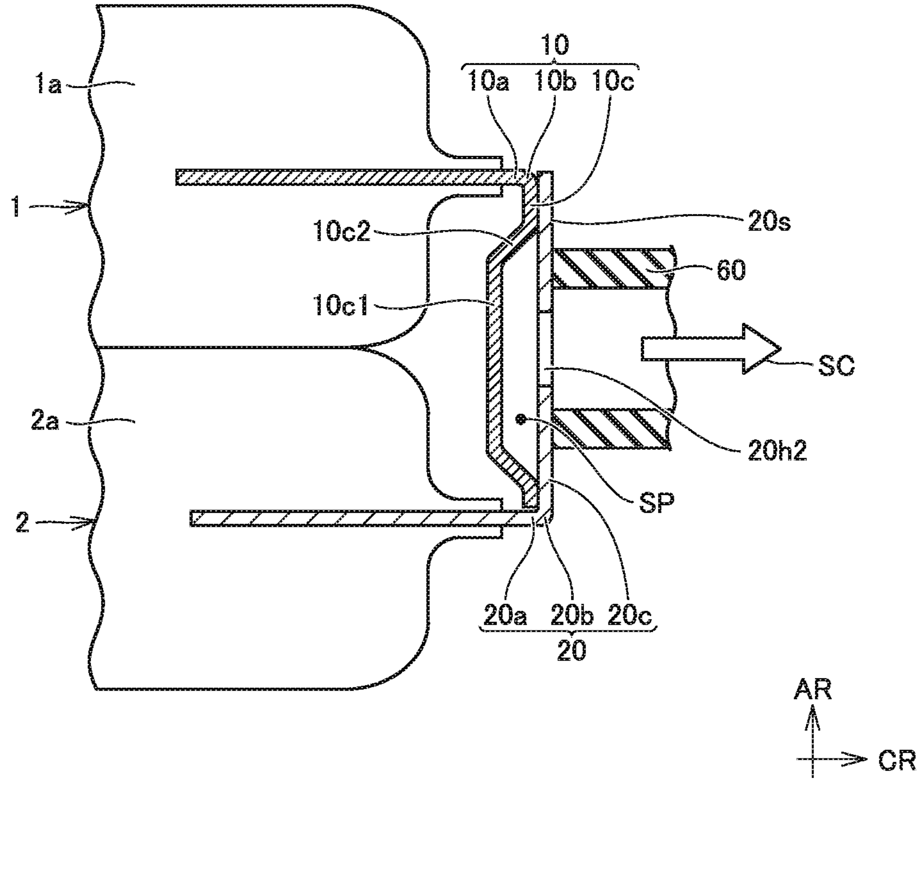
FIG. 5 is a cross-sectional view taken along line V-V in FIG. 3.
Figure 6:
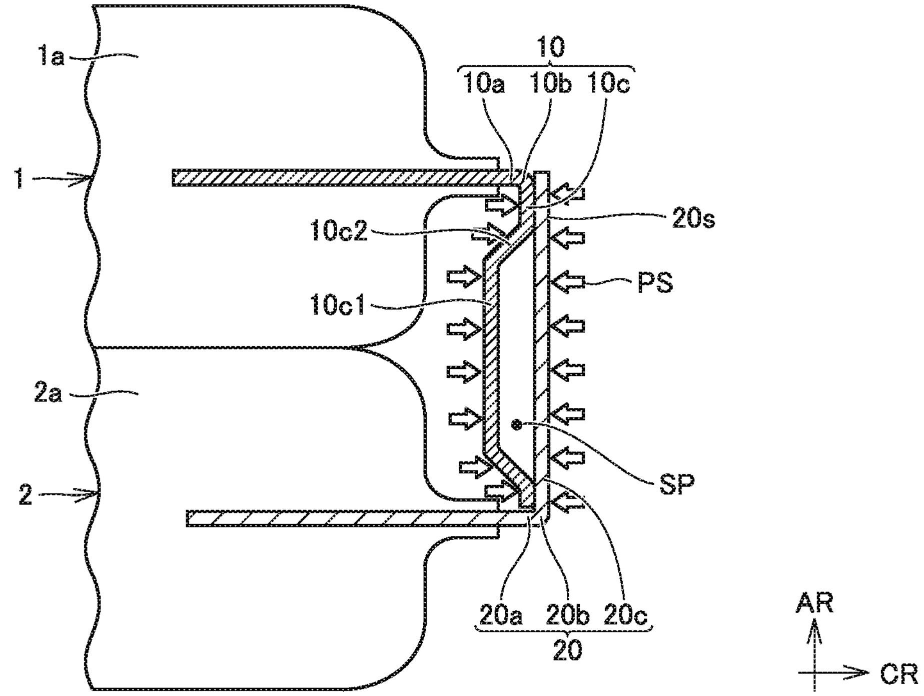
FIG. 6 is a cross-sectional view taken along line VI-VI in FIG. 3.
Figure 7:
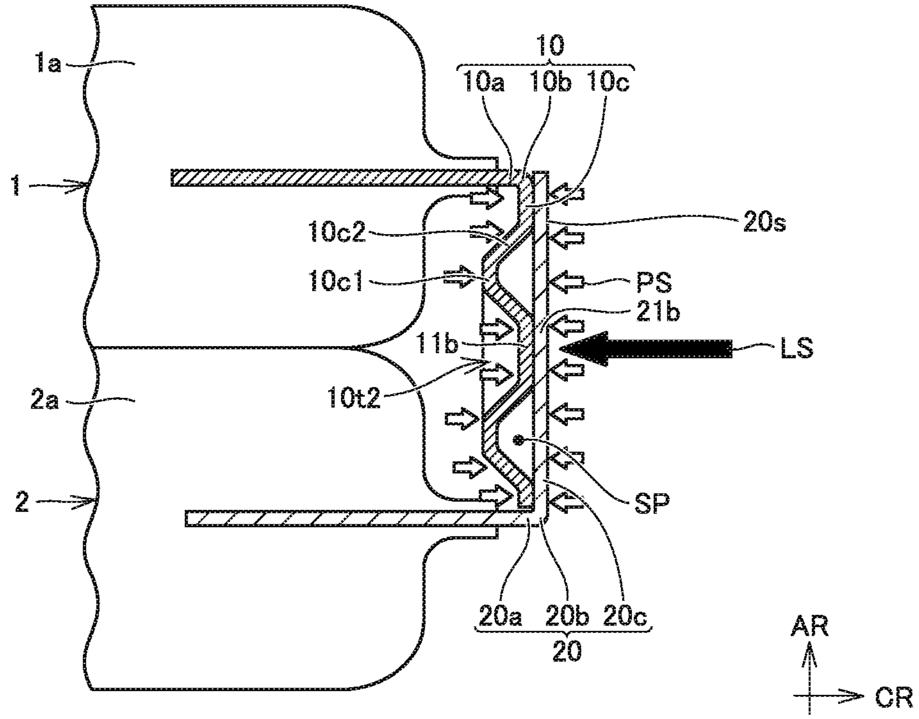
FIG. 7 is a cross-sectional view taken along line VII-VII in FIG. 3.

FIG. 4 is a perspective view illustrating a state in which the electrode terminal 10 and the electrode terminal 20 are welded to each other. FIG. 5 is a cross-sectional view taken along line V-V in FIG. 3, FIG. 6 is a cross-sectional view taken along line VI-VI in FIG. 3, and FIG. 7 is a cross-sectional view taken along line VII-VII in FIG. 3. FIGS. 5 to 7 each illustrate a cross-sectional structure cutting through the bottom plate portion 10_c_1 (in other words, the space SP) of the first joining portion 10_c_ of the electrode terminal 10, and particularly, FIG. 5 illustrates a cross-sectional structure cutting through the pressure reducing port 20_h_2, FIG. 6 illustrates a cross-sectional structure not passing through the convex portions 10_t_1 and 10_t_2 and the pressure reducing ports 20_h_1 and 20_h_2, and FIG. 7 illustrates a cross-sectional structure cutting through the convex portion 10_t_2.

In the manufacturing method of the welded structures 30_a_ and 30_b_, a duct or a nozzle of a suction device 60 (see FIG. 5) is provided for each of the pressure reducing ports 20_h_1 and 20_h_2, and a suction operation is performed on the space SP through the pressure reducing ports 20_h_1 and 20_h_2 to depressurize the space SP (as illustrated by an arrow SC in FIGS. 4 and 5).

As illustrated in FIGS. 6 and 7, when the internal pressure of the space SP is made smaller than the atmospheric pressure, a force is generated to draw the first joining portion 10*c* and the second joining portion 20*c* to approach each other (as illustrated by arrows PS in FIGS. 6 and 7). Thereby, the first portion 11*a* of the electrode terminal 10 is brought into stronger contact with the second portion 21*a* of the electrode terminal 20 or the distance between the first portion 11*a* of the electrode terminal 10 and the second portion 21*a* of the electrode terminal 20 is made smaller than that in the case where the space SP is not depressurized.

As illustrated in FIGS. 4 and 7, in a state where the space SP is depressurized, the first portion 11*a* of the electrode terminal 10 and the second portion 21*a* of the electrode terminal 20 are welded to each other. In the present embodiment, the first portion 11*a* of the electrode terminal 10 and the second portion 21*a* of the electrode terminal 20 are welded to each other by irradiating the outer surface 20*s* of the electrode terminal 20 with a laser beam LS that travels in a direction from the second portion 21*a* of the electrode terminal 20 toward the first portion 11*a* of the electrode terminal 10. For example, the thermal energy of the laser is firstly applied to the electrode terminal 20 which is made of aluminum and has a low melting point and then to the electrode terminal 10 which is made of copper, whereby the electrode terminal 20 is welded to the electrode terminal 10.

[Functions and Effects]

In some embodiments, at the time of welding the two metal members to each other, a gap between the metal members, more specifically, a gap between the welding points of the two metal members is made as small as possible. In some embodiments, the gap (solidification shrinkage amount) between the metal members remains constant each time when the welding is performed.

In the above-described embodiment, the electrode terminals 10 and 20 are brought into contact with each other to form a space SP between the electrode terminals 10 and 20, and by depressurizing the space SP through the pressure reducing ports 20*h*1 and 20*h*2 (the Pascal's law), it is possible to reduce the size of the gap or the variation of the gap. By optimizing the degree of depressurization and the intensity of the laser beam, it is possible to readily improve the welding quality. Therefore, according to the above-described embodiment, it is possible to obtain a welded structure in which the metal members are more sufficiently welded to each other and a manufacturing method thereof as well as a battery in which the electrode terminals of the battery cells are more sufficiently welded to each other and a manufacturing method thereof.

Figure 8:
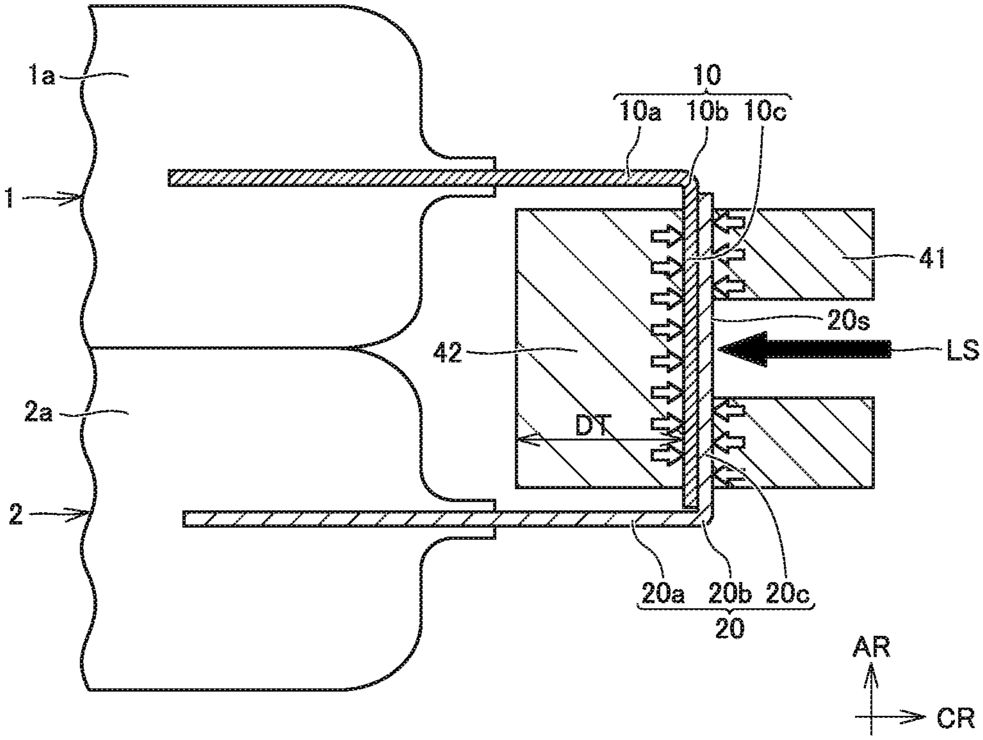
FIG. 8 is a cross-sectional view illustrating a manufacturing method of a welded structure in Comparative Example 1.

FIG. 8 is a cross-sectional view illustrating a manufacturing method of a welded structure in Comparative Example 1. As illustrated in FIG. 8, for example, in the case of resistance welding, the two metal members (the electrode terminals 10 and 20) are clamped and positioned by terminal members 41 and 42 for supplying a voltage, which makes it possible to reduce the size of the gap or the variation of the gap. However, since it is required to ensure a distance between the first joining portion 10*c* and the main body 1*a* and a distance between the second joining portion 20*c* and the main body 2*a* by a thickness DT of the terminal member 42 (see FIG. 8), it is difficult to reduce the size of the entire apparatus.

According to the above-described embodiment, since the electrode terminals 10 and 20 can be welded to each other by irradiating a laser beam on the electrode terminals 10 and 20 in a non-contact manner without the need of disposing the terminal members 41 and 42, it is possible to reduce the size of the entire apparatus as compared with Comparative Example 1 illustrated in FIG. 8. The novel idea disclosed in the above-described embodiment is not limited to a configuration in which the joining surface of the first joining portion 10*c* and the joining surface of the second joining portion 20*c* extend parallel to the stacking direction AR, but may be applied to a configuration in which the joining surface of the first joining portion 10*c* and the joining surface of the second joining portion 20*c* intersect with each other (for example, intersect with each other orthogonally) with respect to the stacking direction AR.

Figure 9:
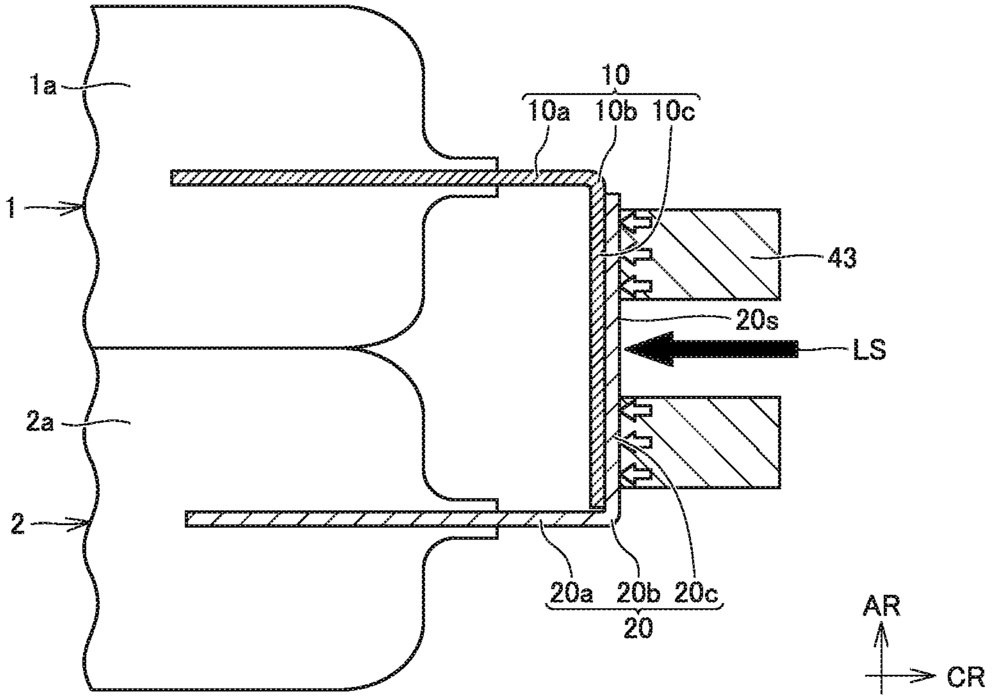
FIG. 9 is a cross-sectional view illustrating a manufacturing method of a welded structure in Comparative Example 2.
Figure 10:
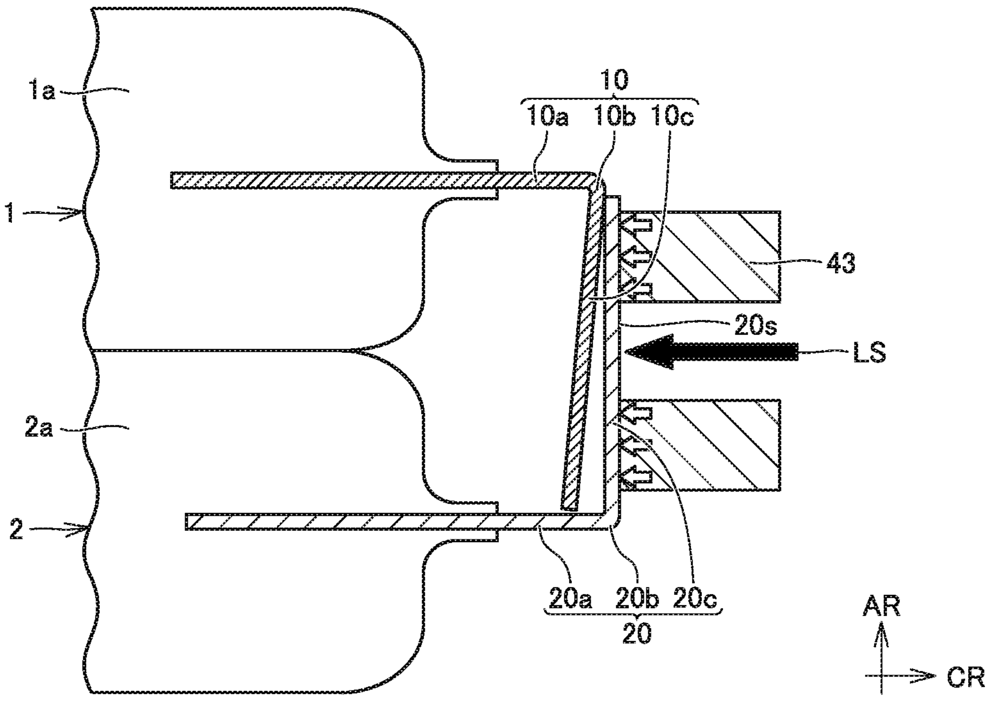
FIG. 10 is a cross-sectional view illustrating a manufacturing method of a welded structure in Comparative Example 2.

FIG. 9 is a cross-sectional view illustrating a manufacturing method of a welded structure in Comparative Example 2. In the case of laser welding, it is possible to reduce the gap by using a pressing member 43 to apply a pressing force to the first joining portion 10*c* and the second joining portion 20*c* from one side only, which makes it possible to reduce the size of the entire apparatus. However, as illustrated in FIG. 10, when a mechanical device such as the pressing member 43 is used to apply a pressing force from one side only, a variation is likely to occur on the gap due to the partial contact, the stress concentration, or the like as compared with the embodiment of the present disclosure.

According to the above-described embodiment, by performing the depressurization in accordance with the Pascal's law to, it is possible to generate a negative pressure substantially uniformly in the entire space SP, and consequently, it is possible to reduce the size of the gap and or the variation of the gap as compared with Comparative Example 2.

In the above-described embodiment, the electrode terminal 20 is formed with two pressure reducing ports 20*h*1 and 20*h*2, but the number of the pressure reducing ports may be one. A pressure reducing port may be formed on the electrode terminal 10 or may be formed on both the electrode terminal 10 and the electrode terminal 20. A pressure reducing port may be formed between a part of the electrode terminal 10 and a part of the electrode terminal 20 by joining the two parts.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A manufacturing method of a welded structure in which a first metal member and a second metal member are welded to each other, the manufacturing method comprising:

bringing the first metal member and the second metal member into contact with each other so as to form a space surrounded by the first metal member and the second metal member, wherein a pressure reducing port being formed between the first metal member and the second metal member or in at least one metal member of the first metal member and the second metal member;

performing a suction operation on the space through the pressure reducing port to depressurize the space so as to bring a first portion of the first metal member into contact with a second portion of the second metal member or to make a distance between the first portion of the first metal member and the second portion of the second metal member smaller than that when the space is not depressurized; and welding the first portion of the first metal member and the second portion of the second metal member to each other in a state where the space is depressurized, the first metal member includes a first extending portion, a first bent portion formed at a distal end of the first extending portion in an extending direction of the first extending portion, and a first joining portion extending from the first bent portion, the second metal member includes a second extending portion, a second bent portion formed at a distal end of the second extending portion in an extending direction of the second extending portion, and a second joining portion extending from the second bent portion, the first metal member includes a bottom plate portion and a peripheral wall portion surrounding the bottom plate portion on the first joining portion, the space is defined by the bottom plate portion, the peripheral wall portion, and the second joining portion of the second metal member, the bottom plate portion is provided with a convex portion, and the convex portion protrudes from the bottom plate portion, a distal end of the convex portion in a protruding direction defines the first portion, and a part of the second joining portion of the second metal member facing the first portion defines the second portion, the welded structure is formed by welding the first joint portion and the second joint portion to each other.

* * * * *